United States Patent [19]

Peeso

[11] Patent Number: 4,793,289

[45] Date of Patent: Dec. 27, 1988

[54] HOLDER FOR SALT BLOCK

[76] Inventor: Patricia A. Peeso, 70 Flanagan Hills Rd., Sterling, Mass. 01564

[21] Appl. No.: 128,642

[22] Filed: Dec. 4, 1987

[51] Int. Cl.$^4$ ............................................. A01K 5/015
[52] U.S. Cl. .................................... 119/51 R; 119/18; 119/61
[58] Field of Search ................... 119/51 R, 61, 18

[56] References Cited

U.S. PATENT DOCUMENTS

| D. 92,107 | 4/1934 | Proctor | 119/18 |
|---|---|---|---|
| D. 118,124 | 12/1939 | MacLean | 119/51 R |
| D. 142,561 | 10/1945 | Hyde | 119/51 R |
| D. 146,408 | 2/1947 | Hyde | 119/51 R |
| D. 175,133 | 7/1955 | Siggins | 119/18 |
| 485,328 | 11/1892 | Lee | 119/51 R |
| 518,819 | 4/1894 | Lee | 119/51 R |
| 804,991 | 11/1905 | Alkire et al. | 119/61 |
| 872,818 | 12/1907 | Hutcheson | 119/61 |
| 1,329,289 | 1/1920 | Carpenter | 119/61 |
| 1,610,175 | 12/1926 | Stabler | 119/61 |
| 2,392,532 | 1/1946 | Hyde | 119/51 R |
| 4,669,421 | 6/1987 | Flintjer | 119/18 |

Primary Examiner—Paul J. Hirsch
Attorney, Agent, or Firm—Charles R. Fay

[57] ABSTRACT

A sturdy holder for a salt block for animals comprising a flat, closed, continuous rear plate; an aligned, spaced front plate in the general shape of a U, said plates being connected by like posts, there being a single post at the closed end of the U forming a bottom, and two vertically spaced posts at each side of the holder, the top being free, open, and unimpeded.

6 Claims, 1 Drawing Sheet

U.S. Patent   Dec. 27, 1988   4,793,289
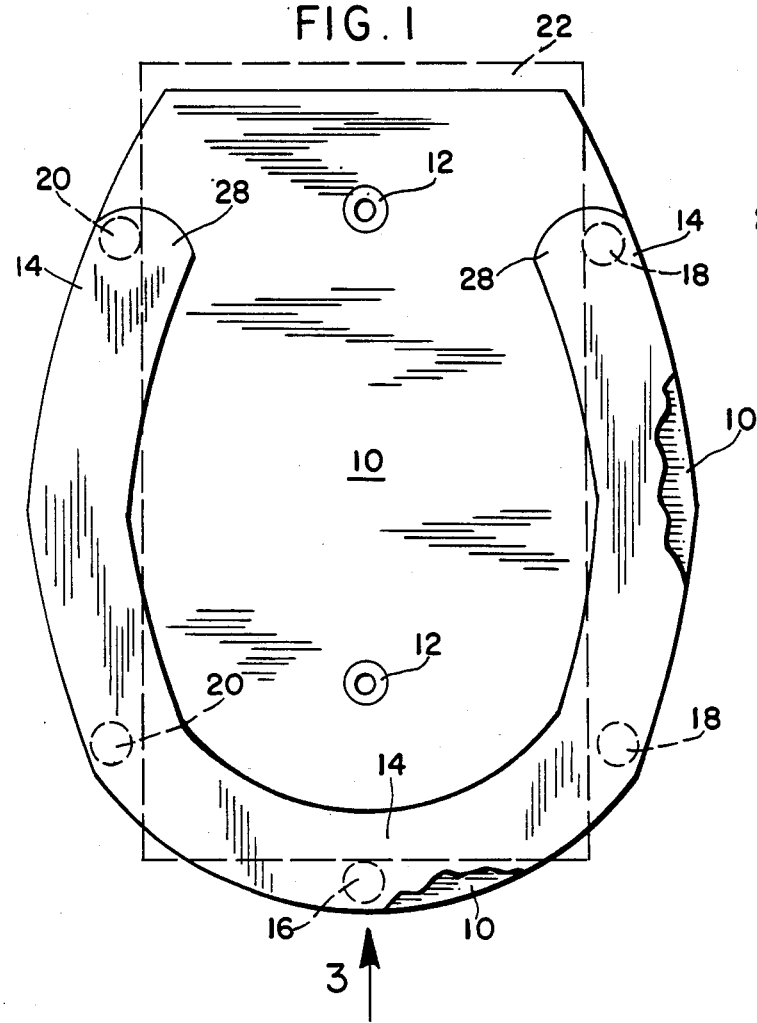
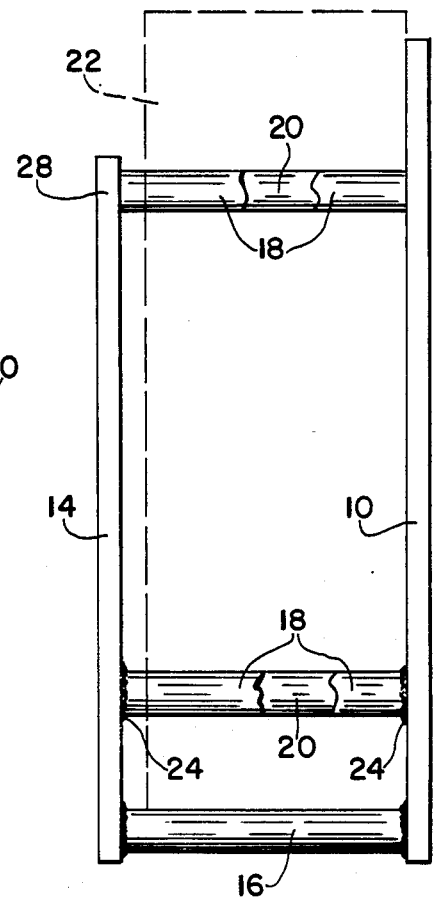
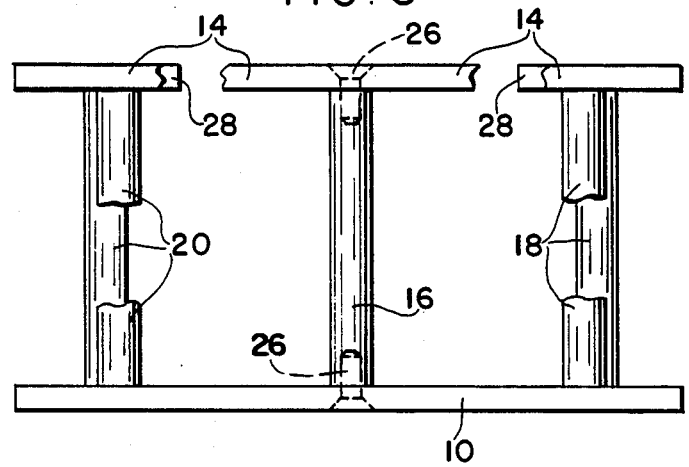

HOLDER FOR SALT BLOCK

BACKGROUND OF THE INVENTION

There have been many holders proposed for holding a salt block in place as in an animal stall, above the ground and with convenient access to the animal. These have been found to be too fragile and having a very short life, e.g., wire forms such as shown in U.S. Design Pat. Nos. 232,313 and 118,124, and others. Other made of sheet stock, such as shown in U.S. Design Pat. Nos. 28,161 and 232,846 are too expensive if made of sufficiently heavy stock or fragile if made of light stock, and in most cases do not provide adequate access. Large animals that require the salt are very hard on these holders, and owners have even gone to a practise of putting the salt in pellets in the hay, which is not satisfactory in many cases. It is the object of this invention to provide a sturdy long lasting holder which is accessible to the animal at the front, sides, and bottom, while preventing the animal from pushing the block out of the holder.

SUMMARY OF THE DISCLOSURE

A rear plate to be fastened to a wall of the stall at a convenient height, is provided with posts extending therefrom in a pattern to form a bottom support for the block to be held and lateral barriers to prevent side motion of the block, but not to impede the tongue of the animal any more than necessary. On the posts there is a front heavy one-piece holder element in the form of a U spaced from the rear plate enough to accept the block which substantially fills the holder. The block is mostly taken by the animal through the opening in the U shaped one-piece holder element but it can also lick the block at bottom and sides, but does not dislodge the block from the holder, so that no top closure of any kind is needed.

BRIEF DESCRIPTION OF THE DRAWING

FIG. 1 is a front elevational view of the novel salt block holder;

FIG. 2 is view in side elevation thereof; and

FIG. 3 is a bottom plan view, looking in the direction of arrow 3 in FIG. 1, parts being broken away.

PREFERRED EMBODIMENTS OF THE INVENTION

A solid back or rear plate 10 is provided with holes 12 by which to secure it to the wall of a stall or in other situations so that the holder is conveniently located for the animal it is intended for. This plate may be of any shape but it is preferred that its outline conform to the general U shape of the front holder element 14, which may be in the general shape of a horse shoe if desired. The rear plate is solid and continuous and the rear plate and front holder element; are spaced apart, but parallel and just accept a conventional salt block therebetween, see FIG. 2.

There are five posts that both connect and separate the rear plate and front holder element; and these posts are sturdy and are placed in a pattern to support the salt block in the holder both vertically and laterally while still allowing the animal to lick the block but not to dislodge it. One post is indicated at 16 and is located centrally at the bottom of the holder and forms a support to keep the block from dropping out. There are two similar posts, spaced and vertically aligned, at each side of the holder, and these are indicated at 18, 18 and 20, 20. All posts are similar and are connected at their ends to the rear plate and front holder element; the posts are thus in vertical pairs at the lateral sides of the holder and the lower posts of each pair are quite close to the single bottom post and remote from the topmost posts of each pair of posts. The salt block is shown in broken lines at 22, and is a commercially obtainable object of a certain and uniform dimensions in the form of a rectangle, the holder being shaped and dimensioned to fit.

The whole holder might be made by casting, die-casting, or ejection molding, or the posts may be welded in place as at 24, FIG. 2, or it can even be assembled by screws, as at 26, FIG. 3. The holder is preferably made of aluminum for appearance and cleanliness.

The front holder element 14 preferably takes the shape of a horse shoe with ends 28 uppermost and extending inwardly to a small degree as indicated in FIGS. 1 and 3. This is a strong shape and the salt block is located somewhat inwardly of the edges of the front holder element.

I claim:

1. A salt block holder comprising a solid, continuous flat plate, a one piece U-shaped front holder, the front plate being open centrally for access to the interior of the holder, the plate, the holder element being otherwise generally of similar outline, said plate and said holder element being spaced and parallel, and having their outline in general conformation,
   a post attached to and connecting the plate and the holder element at the closed end of the U shape, said post being centrally located and forming a bottom for the holder and content thereof,
   a spaced pair of similar posts attached to and connecting the plate and the holder element at both lateral edges thereof, the top of the holder being free, open, and unimpeded, and the sides of the holder being substantially open.

2. The salt block holder of claim 1 wherein the one-piece front holder element is in the general shape of a horse shoe with the ends of the horse shoe being at the top of the holder.

3. The salt block holder of claim 2 wherein the topmost posts lie in the confines of the end portions of the front holder element.

4. The salt block holder of claim 3 wherein the lower of each pair of posts at the sides of the holder are significantly closer to the single bottom post than they are to the topmost posts of each such pair of posts, thereby leaving some access to the contents of the holder at the sides thereof.

5. The salt block holder of claim 1 wherein the entire holder is molded in one piece.

6. The salt block holder of claim 1 wherein the rear plate the one-piece front holder element and the posts are assembled from separate parts.

* * * * *